Jan. 21, 1958     O. HIGHLAND ET AL     2,820,347
TWO-STAGE MASTER CYLINDER FOR HYDRAULIC SYSTEMS
Filed Jan. 27, 1954     2 Sheets-Sheet 1

INVENTORS
OLAF HIGHLAND
LEON A. CHELMO
BY
Williamson, Williamson, Schroeder, & Adams.
ATTORNEYS

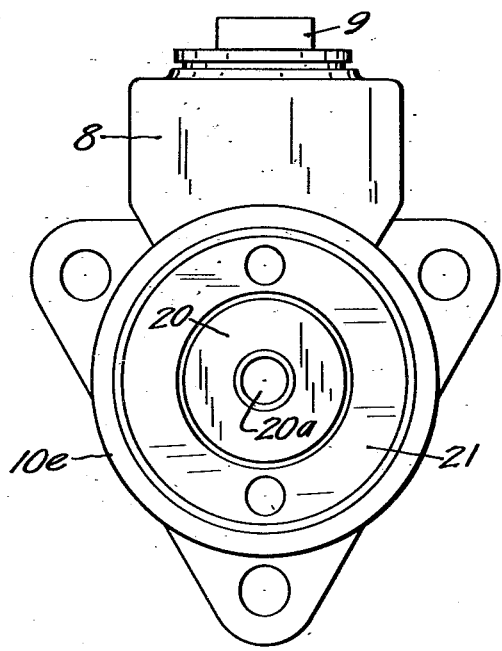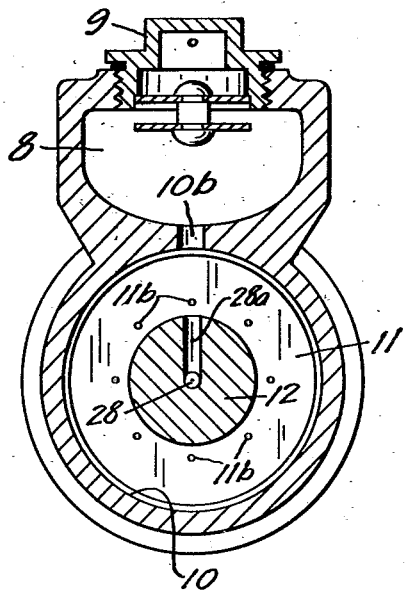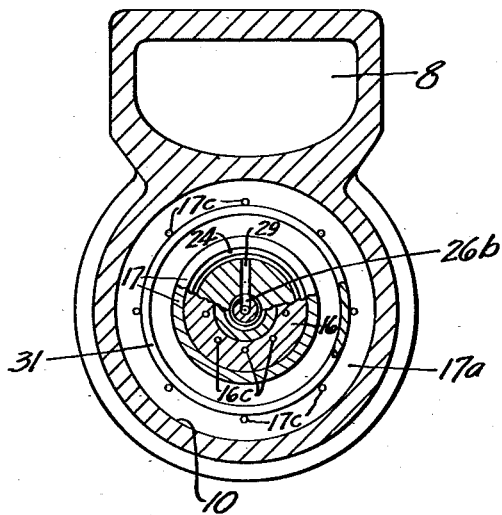

2,820,347

TWO-STAGE MASTER CYLINDER FOR HYDRAULIC SYSTEMS

Olaf Highland, Long Lake, and Leon A. Chelmo, Minneapolis, Minn.

Application January 27, 1954, Serial No. 406,399

3 Claims. (Cl. 60—54.6)

This invention relates to hydraulic braking systems such as are employed in automobiles and particularly to a compound master cylinder unit for producing a two-stage operating function upon the several remotely located brakes.

A number of two-stage master cylinders have heretofore been used for the purpose of taking up slack in the brakes in the initial or low-pressure movement of fluid and on the final portion of the operation of the piston applying high-pressure movement of the fluid to firmly set the brakes. Most of the prior art units have been complicated, usually requiring expensive and uncertain relief valves for relieving pressure on the fluid in the chamber or cylinder having mounted therein the larger diameter piston at the beginning of the second phase of operation. The prior art devices known to us have not successfully applied the high-pressure braking force smoothly and efficiently with the result that, in the last phase of the braking operation, when it is often desired to firmly set the brakes, chattering or fluctuation of the high-pressure piston and fluid in the various brake lines often takes place with uncertain and unsatisfactory results.

It is an object of our present invention to provide a comparatively simple and highly efficient two-stage hydraulic master cylinder, capable of being readily assembled and manufactured at comparatively low cost, and having a relatively large diameter piston for operating the initial braking phase with rapid but rather low-pressure discharge of fluid and employing on an integral or interconnected member a low-pressure piston operating in a relatively small stationary cylinder to apply higher pressure in the later stages of braking to, if desired, even lock the wheels at high-pressure force while nevertheless eliminating the need for special relief valves or cumbersome auxiliary valves and parts requiring addition to the concentric larger and smaller cylinders.

A further object is the provision of a two-stage, master cylinder unit of the class described wherein necessary equalization of pressures between certain chambers of the unit at the beginning of and throughout the high-pressure phase is efficiently and smoothly accomplished without employing a special relief valve unit or equivalent mechanism which is capable of uncertainty, sticking or chattering in its operation.

These and other objects and advantages of our invention will more fully appear from the following description made in connection with the accompanying drawings wherein like reference characters refer to the same parts throughout the several views and in which:

Fig. 3 is a cross section taken on the line 3—3 of Fig. 2;

Fig. 4 is a cross section taken on the line 4—4 of Fig. 2; and

Fig. 5 is a rear end elevation of our master cylinder unit.

Figure 1:
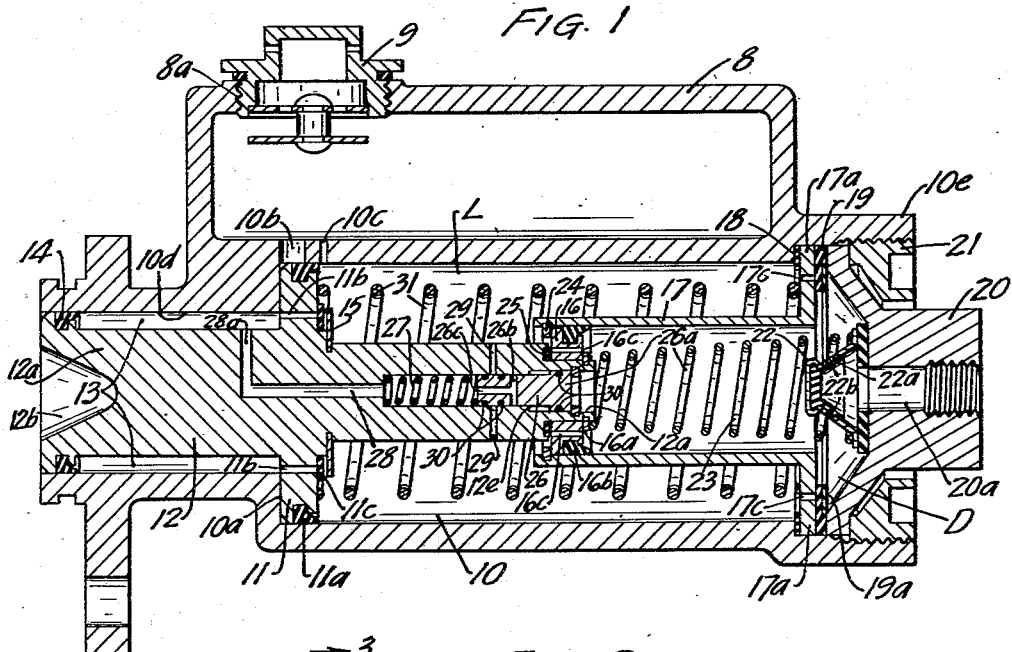
Fig. 1 is a longitudinal, vertical sectional view showing an embodiment of our invention with the movable parts of our structure positioned normally before operation of the brakes.

Referring now to our improved structure, the master cylinder in the embodiment illustrated is formed as an integral casting having an upper fluid reservoir 8 provided adjacent the forward or left-hand end as viewed in Fig. 1, with an internally threaded opening 8a for facilitating filling, which opening is closed by cap-plug 9 of more-or-less conventional type, having breather facilities therein. The lower and greater portion of the said casting is formed to provide a relatively large low-pressure cylinder 10 extending longitudinally of the casting and horizontally from an annular shoulder 10a disposed some distance rearwardly of the diminished left or front end of the casting. Cylinder 10 is communicable with the upper reservoir 8 at its forward end through a vertical larger port 10b and a closely spaced smaller port 10c, the port 10b being closed by the large diameter low-pressure piston 11 when the parts are in normal inoperative position.

An elongated, preferably integral, reciprocable piston-carrying member 12 is concentrically disposed within cylinder 10 and has a forward or left end portion 12a concentrically disposed in an elongated diminished extension bore 10d of cylinder 10 defining, in its spaced relation to the bore 10d, an annular fluid chamber 13. The forward end 12a of the reciprocable piston-carrying member is suitably sealed by a sealing ring 14 or the like against the interior of bore 10d and, at its left forward end, is provided with the usual inwardly extending cavity 12b for the reception of an operating rod (not shown) secured to the brake pedal in conventional manner.

Medially of the ends of reciprocable member 12, a relatively large diametered, low-pressure piston 11 is provided, preferably but not necessarily integrally constructed with the shank portions of member 12 and carrying at its peripheral portion a suitable hydraulic sealing ring 11a, as shown, of the "cup" type, snugly fitting the internal bore of the large cylinder 10. The effective thickness of piston 11 in operation with its sealing ring is such as to close and seal off the communicating port 10b which connects with reservoir 8. The larger piston 11, as shown in Figs. 1 and 4, is drilled or otherwise provided with a plurality of circumferentially spaced communication ports 11b which communicate at the forward ends of the piston with the annular passage 13 provided between bore 10d and the forward cylindrical portion 12a of the reciprocable member. Ports 11b are closed during operation of piston 11 by suitable check valve structure which, as shown, comprises a valve annulus or ring 11c of proper diameter and width to overlie the inner ends of ports 11b, and confined for limited shifting movement to open the passages by a split retaining collar or snap ring 15 which, as shown, is held in a suitable annular groove provided on the medial portion of member 12 inwardly of the location of the valve annulus 11c.

As shown, the inner portion of reciprocable member 12 is somewhat diminished as contrasted with the left end or forward portion thereof being concentrically disposed within the large cylinder 10 and carrying at its inner end a longitudinal shiftable, smaller high-pressure piston 16 which fits in working relation within a concentric stationary smaller cylinder 17. Cylinder 17 as shown, is provided at its rear end with an out-turned, substantially wide, annular flange 17a, the marginal edge of which is secured to and sealed against an annular shoulder 18 provided in the outer or right-hand portion of the larger cylinder 10. The out-turned annular flange 17a of the stationary smaller cylinder is drilled or otherwise apertured to provide a series of circumferentially spaced communication ports 17c (see Figs. 1 and 4). Suitable check valve structure is provided at the rear side of flange 17a to provide for closing of the respective communication ports 17c during certain phases of the operation. As shown, we provide a relatively thin annular check member 19 constructed of highly flexible material such as synthetic rubber reinforced at its rear portions, as shown, by an inset thin metal annulus 19a, preferably constructed of a resilient material such as Phosphor-bronze. The check valve annulus is held in place, as shown, by clamping action between the flange 17a and a large end-closure plug 20 which, at its inner extremity, is recessed in dome-fashion and smoothly fits within the internally threaded outer end portion 10e of the large cylinder 10. A large coil spring 31 is interposed between the rear face of piston 11 and flange 17a for returning or retracting member 12 and the pistons carried thereby in conventional manner.

An end-closure plug nut 21, externally threaded for engagement with the housing portion 10e, is adapted to engage against the rear marginal portion of the plug member 20 to securely clamp the same and, with it, to provide necessary clamping engagement and attachment of the outer marginal portions of the check valve annulus 19a. The plug 20 is axially bored at 20a in conventional manner to form an outlet passage. At the inner end of the bore and plug member 20, a conventional type of inverted, cup-shaped check valve is secured, the structure thereof including an inner flexible cup-shaped element 22a, usually made of rubber, the flexible skirt of which cooperates with circumferentially spaced ports 22b formed in the converging portion of the metal cup 22. Such structure is conventionally used with master cylinders and is retained in operative position and pressed outwardly against the medial portion of plug 20 by a coil spring 23 confined within the stationary cylinder 17 and having a tension sufficient to maintain from seven to eleven pounds of pressure in the "off" position of the brakes on the fluid within the respective brake lines serviced by the system or master cylinder. The inner end of the coil spring 23 is abutted against a ring or collar 16a affixed adjacent the extremity of the piston-carrying member 12. This collar 16a, as shown, is fixed in a suitable annular groove of member 12 and also acts as an abutment ring to limit the slight rearward shifting of the high-pressure or smaller piston 16.

Referring now in detail to said high-pressure piston 16, it is confined for limiting shifting movement between an annular shoulder formed by diminishing the right hand extremity of the member 12 and which carries an annular valve seat ring 25 and the collar or ring 16a previously referred to, which is affixed in an annular groove provided just adjacent the inner extremity of the reciprocable piston-carrying member 12. Piston 16 carries a conventional "cup" type sealing ring 16b of resilient material which concentrically and integrally engages the bore of cylinder 17.

Inwardly of the peripheral edge of high-pressure piston 16 and in position to be closed against the annular valve seat ring 25, we drill or otherwise provide a series of circumferentially spaced communication ports 16c, thus making possible communication between the interior of the smaller and stationary high-pressure cylinder 17 and the relatively large annular fluid chamber defined between the inner portion of reciprocable piston-carrying member 12 and the inner periphery of the large cylinder 10.

An important feature of our invention in close combination with the working parts and essential chambers and cylinders is the provision of a longitudinally shiftable, preferably plug-type staging valve 26 which is slidably and concentrically carried within an axial bore provided in the inner portion of the reciprocable piston-carrying member 12, said bore, as shown, extending from the rear extremity of member 12 for some distance inwardly for accommodation of the cylindrical plug 26 and also mounting on a staging-valve-coil spring 27. A longitudinal passage 28, in effect a continuation but diminution of bore housing plug-valve 26 and spring 27, is provided extending to a point forwardly of the low-pressure and larger piston 11 and passage 28 is connected by a radial port 28a with the annular chamber 13 between the forward portion of member 12 and the concentric bore 10d forming a part of the casting.

The staging valve 26 is provided, as shown, with a slightly enlarged cylindrical head 26a which smoothly fits a somewhat larger bore 12d in the inner extremity of member 12, the enlargement of said head portion 26a providing a shoulder for abutment with a shoulder 12e provided in the bore for receiving plug member 26 and thereby limiting the left-hand movement of the plug to a predetermined extent.

To make possible effective operation of the high-pressure piston 16 within cylinder 17, it is necessary that pressures between the front annular fluid chamber 13 and the large annular chamber L be equalized at the proper stage of operation. To this end, communication between said chambers is made possible by interconnecting passages controlled by left-hand movement of the plug stage valve 26. A portion of the piston-carrying member 12 which surrounds the stage valve 26 is cross-bored at 29, said cross-bores 29 being aligned with an annular groove formed in the periphery of the intermediate portion of plug 26 upon left-hand extreme movement of the sliding plug 26. The annular groove is in communication with a diametric port 26b, which port 26b communicates with an axially disposed port 26c formed at the left-hand portion of the plug stage valve 26. Said axial port 26c extends to the left end of plug 26 and, of course, communicates with the bore containing coil spring 27 which, in turn, communicates with the longitudinal passage 28 within member 12 which passage has previously been described. To properly seal the plug stage-controlling valve 26, suitable sealing means such as a plurality of longitudinally spaced O-rings 30 may be employed, seated in suitable annular grooves provided in the periphery of the plug member.

The discharge end of end-closure plug 20 is, of course, in operation connected with a suitable fitting or manifold which is, in turn, connected with the respective brake lines, which lines, of course, service the usual brake cylinders or motors disposed at the respective wheels of the vehicle.

It will be seen that, in the embodiment shown, the rear portion within high-pressure cylinder 17 and the spaces between out-turned flanges 17a of said cylinder and the recessed inner end of the large end-closure plug constitute a fluid discharge chamber which we identify by the letter D. Pressure is equalized within discharge chamber D with the low-pressure cylinder 10 throughout all pressure stages or protraction of the pistons 11 and 16. Such equalization is accomplished through the mounting of the high-pressure piston 16 for slight longitudinal shifting movement and communication ports 16c closed by the valve seat ring 25 only when back pressure is greater than the pressure within chamber L of the large cylinder. Thus, only in the retraction of the reciprocable piston-carrying member 12 are the ports 16c and 17c closed but, at such time, the longitudinal passage 28 within reciprocable member 12 is open for communication through port 29 with the interior of large cylinder 10 to equalize pressures with the forward annular fluid chamber 13 which, until complete retraction of the piston, is in communication with the fluid reservoir 8.

*Operation*

In operation, when initial downward pressure is applied upon the brake pedal (not shown) and communicated through the operating rod with the recessed forward end of reciprocable piston-carrying member 12, this produces initial right-hand sliding movement of member 12, thereby immediately putting the reservoir 8 in communication with the forward portion of cylinder 10 forward, however, of the low-pressure piston 11. Right-hand movement of the larger and low-pressure piston 11, of course, effects the sealing and closure of the check valve annulus 11c, and fluid in the large annular chamber L is forced rearwardly at low pressure and may enter the interior of the stationary and smaller cylinder 17 through the ports 16C, the check valve ring 16a then being opened. Fluid also enters the discharge chamber D through the circumferentially spaced ports 17c formed in the out-turned flange 17a of the smaller cylinder. In the inital protraction or rearward movement of the two pistons 11 and 16, therefore, a relatively large quantity of fluid at relatively low pressure is discharged into discharge chamber D at a pressure sufficient to open up the flexible skirt valve 22a and permit discharge of fluid under pressure through axial passage 20a to the respective brake lines.

Figure 2:
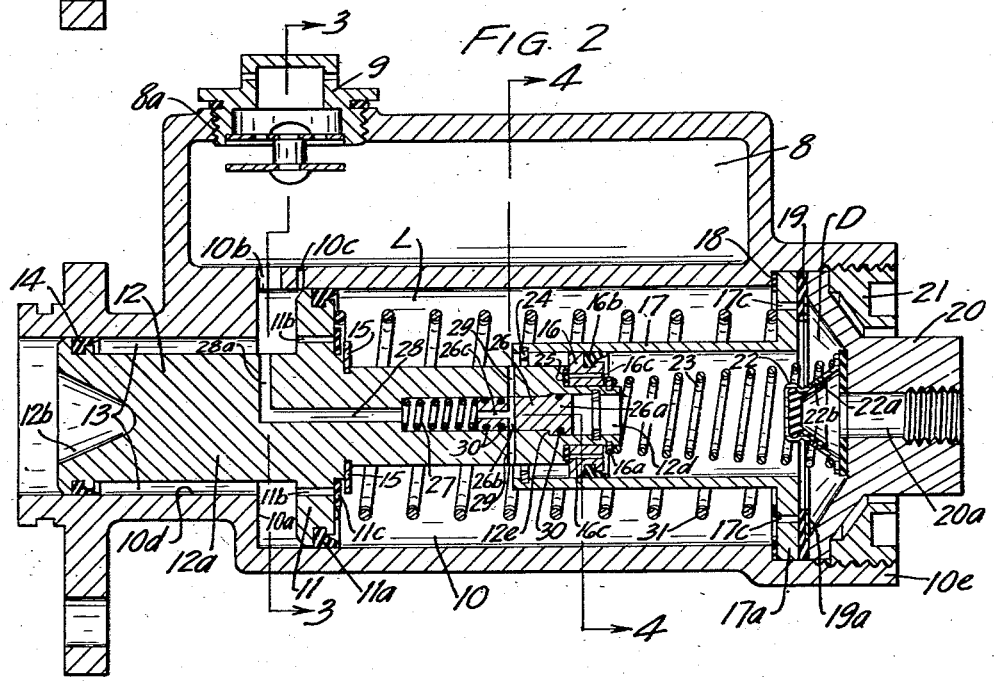
Fig. 2 is a similar sectional view showing the parts related after initial operation of the brake pedal and completion of the low-pressure large diameter piston phase of the braking operation and at the start of the high-pressure, smaller piston phase of operation.

During the initial protraction of the piston-carrying member or plunger 12 (see Figure 2) it will be noted that the annular chamber 13 forward of piston 11 is in communication with the fluid reservoir 8 and until the staging valve 26 is shifted to the position shown in Figure 2, the pressures within annular chamber 13 and the fluid reservoir 8 will be equal and at atmospheric pressure. This being the case, with pressures increasing within the smaller cylinder 17 (and, of course, in the large chamber L of large cylinder 10) the outer extremity of the head 26a of the staging valve will be subjected to the increased pressure and when this is sufficient to overcome the tension of the coil spring 27, the plug member 26 will be retracted to the limit of movement shown in Figure 2 and this then puts the interior of cylinder 10 defining large fluid chamber L in communication with the annular forward chamber 13 between the forward end of member 12 and the portion of the housing surrounding the same.

The shifting of staging valve 26 thus retains a higher pressure within discharge chamber D and within high-pressure cylinder 17 while lowering the pressure within the large cylinder 10, check valves 19 immediately closing and the shiftable high-pressure piston 17 being retracted to close off communication through the circumferentially spaced ports 16c by abutment of the left-hand ends of said ports with the valve seat ring 25.

The high pressure stage of the braking operation begins when staging valve 26 shifts to the chamber-communicating position shown in Fig. 2 which in an automotive, hydraulic braking system takes place in the final depression of the brake pedal or pedals. Rearward or protractive movement of the piston-carrying member 12 past the position shown in Fig. 2 effects high pressure actuation of the hydraulic fluid through the medium of the smaller piston 16 and to the discharge passage 20a supplying the respective brake lines. In said high pressure stage of course less fluid is discharged than in the lower pressure stage previously described and the pressures within chamber L defined by the larger cylinder 10 and the forward annular chamber 13 and the fluid reservoir 8 are all equalized through the communication channels including longitudinal passage 28 in member 12, lateral passage 28a and the intercommunication of annular chamber 13 with reservoir 8 through ports 10b and 10c forwardly of the protracted position of the larger piston 11.

In actual operation the initial actuation of the brake pedal through its connection with the forward recessed end of reciprocable member 12 immediately at low pressure produces the discharge of a substantially large amount of fluid to the brake lines to immediately take up slack in the brake cylinders or motors of the respective wheels of the automobile and to thereafter apply braking force of course according to the adjustment desired. Further depression of the brake pedal effecting additional protraction or rearward movement of plunger member 12 relieves the interior of cylinder 16 defining chamber L from pressure and causes discharge of a relatively smaller amount of fluid at relatively high pressure through protraction of the high pressure piston 16 in cylinder 17. The operation of the staging valve 26 is positive and smooth with the result that transition from the low pressure stage to the high pressure stage, will not be accompanied with pulsations in the brake line as is the case with most devices of the prior art. The staging valve 26 cannot chatter or fluctuate since its head 26a is concentrically disposed within the open inner extremity of reciprocable member 12 and subjected to the pressure within cylinder 17 to retract the plug valve 26 against the balance tension of coil spring 27, such retraction smoothly taking place until the staging valve is in its extreme retracted position as shown in Fig. 2.

Thus, with little requirement of power in the high pressure stage, the wheel cylinders are positively operated with greatly increased fluid pressure. The brakes may consequently, for emergencies, be quickly locked or set after initial braking as desired has been effected.

Upon release of the brake pedal, the heavy coil spring 31 previously compressed by protraction of the larger piston 11 returns reciprocable member 12 and the two pistons carried thereby to retracted position. Retraction of these pistons in their respective cylinders of course releases operative differential pressure from the head of staging valve 26 and simultaneously causes a slight shifting of smaller piston 16 rearwardly to open the circumferentially spaced communication ports 16c, thereby equalizing pressures between the interiors of the smaller and larger cylinders 17 and 10 respectively. Fluid will therefore be returned to the master cylinder unit to the extent required to maintain the lines full of fluid at a slight pressure, such pressure being determined by the relation of the coil spring 23 and its tension to the check valve structure 22, the metal skirt of said check valve structure being retractible from its annular sealing member in conventional manner.

From the foregoing description it will be seen that we have provided an efficient, comparatively simple multiple stage master cylinder unit requiring a minimum number of parts and operative to smoothly and positively produce high pressure stage discharge of fluid without pulsation, extra pressure relief valves or the like.

It will of course be understood that various changes may be made in the form, details, arrangement and proportions of the parts without departing from the scope of invention.

What is claimed is:

1. A multiple-stage, master cylinder unit for hydraulic brake systems, comprising a chamber-defining body having forward and rear ends and having a low pressure cylinder and a fluid reservoir above the cylinder and communicating therewith intermediate the ends thereof, a reciprocable piston-carrying member in the cylinder and having a low pressure piston thereon normally disposed intermediate the ends of the cylinder and projectable rearwardly therefrom, a second fluid-retaining piston on said member and disposed at the forward end of the cylinder and movable rearwardly therefrom, a high pressure cylinder-defining sleeve within the rear end of the low pressure cylinder and having a diameter substantially less than the diameter of the low pressure cylinder, the high pressure cylinder having a radial flange at its rear end and with spaced flow passages in the flange, a closure at the rear end of the low pressure cylinder defining a discharge chamber, means sealing a marginal portion of the flange to the low pressure cylinder wall, check valve means permitting flow through the passages in the flange from the low pressure cylinder to the discharge chamber, a high pressure piston in the sleeve to move fluid at high pressure rearwardly through the sleeve and discharge chamber, a reduced diameter portion at the rear end portion of the piston carrying member, said high pressure piston being slidably mounted on the said reduced rear end portion of the piston-carrying member, means in said high pressure piston defining a restricted flow passage between the high and low pressure cylinder, means limiting movement of the high pressure piston on the piston carrying member and including closure means on the forward side of the high pressure piston and preventing forward flow from the high pressure cylinder when pressure therein exceeds pressure in the low pressure cylinder, the rear end portion of the piston-carrying member having a longitudinally extending staging valve-mounting bore in fluid flow communication with the high pressure cylinder and also having a transverse aperture behind the high pressure piston and communicating with the bore and with the low pressure cylinder, said piston-carrying member also having a flow passage communicating with the forward end of the bore and forward side of the low pressure piston, a slidable staging valve-forming piston in said bore, the bore wall having a rearwardly facing annular shoulder surface, the valve-forming piston having an annular surface portion opposed to said shoulder surface and engageable therewith for limiting forward shifting of the piston in the bore, abutment means in the rearward end of the bore and limiting rearward shifting of the valve-forming piston, said valve-forming piston having a passage through the periphery thereof and through the forward end thereof and located to be aligned with the transverse aperture in the piston-carrying member when the valve-forming piston is shifted to its forward limit of movement in the bore, and spring means in the bore and bearing against the valve-forming piston whereby to urge the piston rearwardly and permit forward shifting thereof in response to predetermined fluid pressure within the high pressure sleeve.

2. The invention set forth in claim 1 wherein the rear end portion of said piston-carrying member is reduced to define a cylindrical surface mounting the high pressure piston and an annular shoulder surface in sealing relation to the forward side of the high pressure piston to close said restricted flow passage between the high and low pressure cylinders.

3. A multiple-stage, master cylinder unit for hydraulic brake systems, comprising a chamber defining body having forward and rear ends and having a low pressure cylinder and a fluid reservoir above the cylinder and communicating therewith intermediate the ends thereof, a reciprocable piston-carrying member in the cylinder and having a low pressure piston thereon normally disposed intermediate the ends of the cylinder and projectible rearwardly therefrom, a second fluid-retaining piston on said member and disposed at the forward end of the cylinder and movable rearwardly therefrom, a high pressure cylinder-defining sleeve within the rear end of the low pressure cylinder and having a diameter substantially less than the diameter of the low pressure cylinder, said sleeve having an outturned annular flange at its rear end sealed to the low pressure cylinder wall, the flange having a plurality of flow apertures therethrough, a flat, resiliently flexible and annular valve element lying against the rear side of the flange in overlying relation with the flow aperture therein, a closure element-defining stationary discharge chamber in the rear end of the low pressure cylinder and having a forwardly extending peripheral portion engaging and clamping the valve element to the flange to permit rearward flexing of the inner periphery of the valve element to permit rearward fluid flow through the apertures, and to prevent forward fluid flow therethrough, said piston-carrying member having a rear end portion extending into the sleeve, a high pressure piston in the sleeve to move fluid at high pressure rearwardly through the sleeve and discharge chamber, said high pressure piston being movably mounted on the rear end portion of the piston-carrying member and defining a restricted flow passage between the high and low pressure cylinders, means limiting movement of the high pressure piston on the piston carrying member and including closure means on the forward side of the high pressure piston and preventing forward flow from the high pressure cylinder when pressure therein exceeds pressure in the low pressure cylinder, the rear end portion of the piston-carrying member having a longitudinally extending staging valve-mounting bore in fluid flow communication with the high pressure cylinder and also having a transverse aperture behind the high pressure piston and communicating with the bore and with the low pressure cylinder, said piston-carrying member also having a flow passage communicating with the forward end of the bore and forward side of the low pressure piston, a slidable valve-forming piston in said bore, the bore wall having a rearwardly facing annular shoulder surface, the valve-forming piston having an annular surface portion opposed to said shoulder surface and engageable therewith for limiting forward shifting of the piston in the bore, abutment means in the rearward end of the bore and limiting rearward shifting of the valve-forming piston, said valve-forming piston having a passage through the periphery thereof and through the forward end thereof, said passage to the periphery being located to be aligned with the transverse aperture in the piston-carrying member when the valve-forming piston is shifted to its forward limit of movement in the bore, and spring means in the bore and bearing against the valve-forming piston whereby to urge the piston rearwardly and permit forward shifting thereof in response to predetermined fluid pressure within the high pressure sleeve.

References Cited in the file of this patent

UNITED STATES PATENTS

| | | |
|---|---|---|
| 2,095,512 | Oliver | Oct. 12, 1937 |
| 2,104,735 | Carroll et al. | Jan. 11, 1938 |
| 2,298,848 | Swift | Oct. 13, 1942 |
| 2,322,009 | Fowler | June 15, 1943 |
| 2,335,069 | Loweke | Nov. 23, 1943 |
| 2,381,930 | Schnell | Aug. 14, 1945 |
| 2,410,169 | La Brie | Oct. 29, 1946 |
| 2,518,821 | Roy | Aug. 15, 1950 |